United States Patent [19]
Kumpfbeck et al.

[11] Patent Number: 5,502,447
[45] Date of Patent: Mar. 26, 1996

[54] BEAM SHARPENED PENCIL BEAM ANTENNA SYSTEMS

[75] Inventors: Richard J. Kumpfbeck, Lloyd Harbor; Peter W. Hannan, Smithtown, both of N.Y.

[73] Assignee: Hazeltine Corporation, Greenlawn, N.Y.

[21] Appl. No.: 144,910

[22] Filed: Oct. 28, 1993

[51] Int. Cl.$^6$ .................................................. H01Q 3/22
[52] U.S. Cl. .................... 342/373; 342/372; 342/81
[58] Field of Search .................................. 342/373, 372, 342/361, 362, 81

[56] References Cited

U.S. PATENT DOCUMENTS

| | | | |
|---|---|---|---|
| 3,576,579 | 4/1971 | Appelbaum | 343/778 |
| 4,425,567 | 1/1984 | Tresselt | 343/373 |
| 4,962,383 | 10/1990 | Tresselt | 343/700 MS |
| 5,248,984 | 9/1993 | Sezai | 342/427 |

FOREIGN PATENT DOCUMENTS 0028969 of 0000 European Pat. Off. .
2568018 of 0000 France .

Primary Examiner—Thomas H. Tarcza
Assistant Examiner—Dao L. Phan
Attorney, Agent, or Firm—E. A. Onders; K. P. Robinson

[57] ABSTRACT

A beam sharpened antenna pattern is achieved by intercoupling signals from individual radiating elements of an array to produce a sum mode signal and a ring mode signal. The ring mode signal represents a forward-directed antenna pattern having a zero to 360 degree progressive phase characteristic around a pattern axis. Beam sharpening results from processing the sum and ring mode signals to provide a pattern having 360 degree beam sharpening, which represents portions of the sum mode pattern of amplitude greater than the amplitudes of selected portions of the ring mode signal. The ring mode signal may be provided on a predetermined basis after selected attenuation or amplification in order to provide a beam sharpened antenna pattern having a modified characteristic. In some applications, received signals are processed on a simultaneous sum mode and ring mode basis, while during transmission pulsed sum mode and ring mode antenna patterns are activated on a sequential, timed basis. Arrangements for use of the invention with two-dimensional-scan and one-dimensional-scan phased arrays are also described.

19 Claims, 2 Drawing Sheets

BEAM SHARPENED PENCIL BEAM ANTENNA SYSTEMS

This invention relates to pencil beam antenna systems suitable for Identification Friend or Foe (IFF) systems and other applications and, more generally, to antenna systems providing a sum mode signal and a ring mode signal, the latter having a zero to 360 degree progressive phase pattern characteristic.

BACKGROUND OF THE INVENTION

Defense weapon systems typically include provision for target identification before active engagement of the weapon. An IFF system may, for example, be used to distinguish between friendly and unfriendly aircraft in order to permit action to be taken against an unfriendly aircraft. In operation the IFF system must be able to provide accurate target discrimination in the presence of a plurality of aircraft. Typical existing IFF antenna systems use antennas providing a fan beam of fixed vertical orientation which can be mechanically rotated in azimuth. Such antennas provide only azimuth discrimination between potential targets, so that all aircraft within an azimuth beamwidth are commonly interrogated, regardless of differing aircraft altitudes. In certain defense weapons system applications using this type of azimuth discriminating antenna, the weapon system cannot be activated against a low altitude unfriendly aircraft so long as a friendly aircraft is within the same azimuth beamwidth. This result obtains even if the friendly aircraft is at a much higher elevation. As a result, weapons system effectiveness may be limited under high traffic conditions involving a number of aircraft.

It is therefore an object of this invention to provide pencil beam antenna systems having antenna patterns capable of distinguishing between multiple target positions in both elevation and azimuth.

An additional object is to provide antenna systems operating with both a sum mode antenna pattern and a new type of ring mode antenna pattern extending in the direction of the sum mode beam centerline and having a zero to 360 degree progressive phase characteristic around such centerline.

Another object is to provide antenna systems wherein a sum mode signal and a ring mode signal are processed to provide an antenna pattern providing new and improved operating characteristics. Further objects are to provide new and improved antenna systems which avoid one or more shortcomings of prior antenna systems.

SUMMARY OF THE INVENTION

In accordance with the invention a dual mode antenna system, having a sum mode and a ring mode and providing 360 degree beam sharpening, includes an array of radiating elements positioned around a central axis with each radiating element arranged to provide an antenna pattern nominally in the direction of the central axis. Intercoupling means intercouple the radiating elements to provide a linearly polarized sum mode signal by combining signals from a plurality of the radiating elements and to provide a linearly polarized ring mode signal (representing an antenna pattern having a zero to 360 degree progressive phase characteristic around said central axis) by combining in a predetermined differential-phase relationship signals from selected ones of the radiating elements positioned around the central axis. The antenna system also includes processing means, coupled to the intercoupling means, for processing the sum mode and ring mode signals to provide a beam sharpened antenna pattern representing portions of the sum mode pattern of amplitude greater on a predetermined basis than the amplitudes of selected portions of the ring mode pattern.

In a particular form of antenna system in accordance with the invention the array includes radiating elements, in the form of four commonly aligned dipoles, positioned at zero, 90, 180 and 270 degree positions around the central axis and the intercoupling means is made up of:

means for combining signals from the radiating elements at such zero and 180 degree positions to provide a first sum output and a first difference output;

means for combining signals from the radiating elements at such 90 and 270 degree positions to provide a second sum output and a second difference output;

means for combining the first and second sum outputs to provide the desired sum mode signal; and means for combining the first and second difference outputs in a quadrature phase relationship to provide the desired ring mode signal.

For a better understanding of the invention, together with other and further objects, reference is made to the following description taken in conjunction with the accompanying drawings and the scope of the invention will be pointed out in the accompanying claims.

DESCRIPTION OF THE INVENTION

Figure 1:
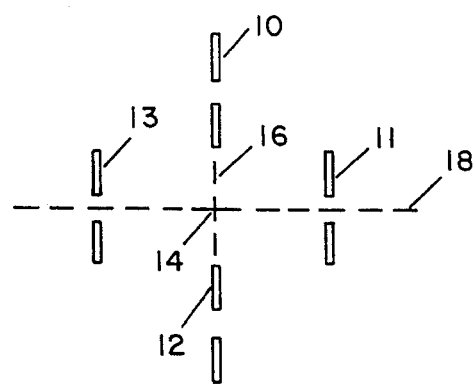
FIG. 1 illustrates a four dipole array suitable for use in antenna systems in accordance with the invention.

FIG. 1 shows a front view of an array of radiating elements suitable for use in a dual mode (sum mode and ring mode) antenna system in accordance with the invention. As illustrated, dipoles 10, 11, 12 and 13 are positioned around a central axis 14, which is perpendicular to the page of the drawing. Dipoles 10–13 are commonly aligned to operate with vertical polarization and are positioned with dipoles 10 and 12 lying along vertical line 16 and dipoles 11 and 13 located along horizontal line 18, in quadrature relationship to dipoles 10 and 12. Thus, dipoles 10–13 are respectively located at zero, 90, 180 and 270 degree positions around central axis 14. As shown, each of dipoles 10–13 has its arms positioned in a common plane perpendicular to central axis 14, with all of the dipoles aligned with arms extending in a common direction. With this arrangement, each of the dipoles 10–13 provides a radiation pattern nominally in the direction represented by central axis 14 (e.g., forward, out of the page, in the FIG. 1 view). The FIG. 1 antenna also includes a conductive ground plane (not shown) positioned behind dipoles 10–13 parallel to the page of the drawing. In a typical embodiment, for an operating wavelength in the range of ten to twelve inches, elements 10–13 may comprise dipoles having a length of approximately one-half wavelength with center to center spacings along lines 16 and 18 of about ten inches. In other embodiments, the type, number and positioning of the radiating elements, the use or non-use of a ground plane, etc., may be different as determined by persons skilled in the field in view of specific applications and operating objectives.

Figure 2:
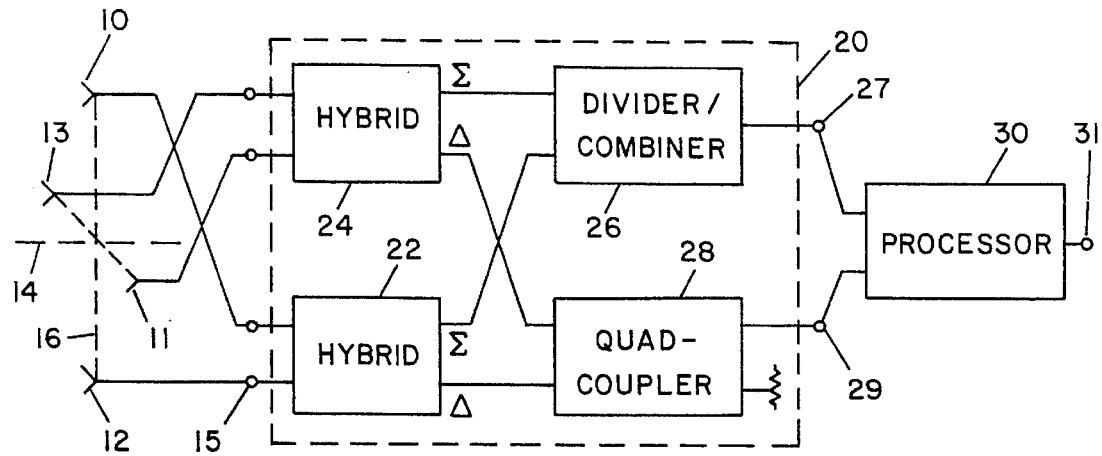
FIG. 2 is a block diagram of an antenna system in accordance with the invention.

Referring now to FIG. 2, there is shown a block diagram of an antenna system utilizing the invention. At the left, the FIG. 1 array is represented in a simplified side perspective view, with central axis 14 extending horizontally to the left. As shown, radiating elements 10–13 are connected to intercoupling means 20, which is effective to intercouple the elements in order to provide sum mode and ring mode antenna system operation reciprocally for both reception and transmission. Intercoupling means 20 includes the following elements in the illustrated embodiment. Hybrid coupler 22 functions as means for combining signals from radiating elements 10 and 12 (shown at the zero and 180 degree positions) to provide outputs in the form of first sum and difference representations of signals input from elements 10 and 12. Similarly, hybrid coupler 24 combines signals from radiating elements 11 and 13 at the 90 and 270 degree positions to provide second sum and difference outputs at the correspondingly marked upper and lower output ports of unit 24 in FIG. 2. Divider/combiner 26 is coupled to the respective first and second sum ports of hybrids 22 and 24 and, during reception, is effective to provide a sum mode signal, representative of a summing of the first and second sum signals, at sum mode port 27. The sum mode signal at port 27 thus represents a summing of signals received by each of radiating elements 10, 11, 12 and 13. Quad-coupler 28 is coupled to the respective first and second difference ports of hybrids 22 and 24 and, during reception, is effective to provide a ring mode signal at port 29 which is representative of a combining of the first and second difference signals in a quadrature phase relationship, as will be further described.

Figure 3A:
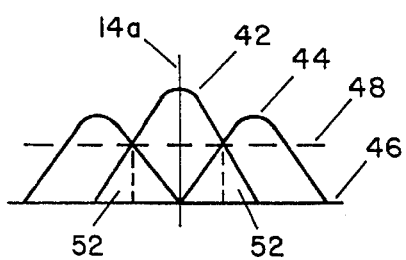
FIGS. 3A, 3B and 3C are simplified antenna pattern representations useful in describing operation of the FIG. 2 antenna system.
Figure 3B:
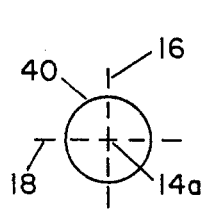

The FIG. 2 antenna system further includes processing means, shown as processor 30, coupled to the intercoupling means 20, via ports 27 and 29. In this embodiment, during reception, processor 30 is arranged to compare the magnitude of the sum mode signal from port 27 with the ring mode signal from port 29 to provide an effective system pattern that is beam sharpened and has a beam cross-section as represented at 40 in FIG. 3B. As will be described further, this beam sharpened antenna pattern represents portions of the sum mode pattern which are of amplitude greater, on a predetermined basis, than the amplitudes of selected portions of the ring mode pattern. During transmission, processor 30 is arranged to operate on a timed, sequential basis to first cause transmission of a sum mode signal by supplying a coded pulsed signal to sum mode port 27, and then cause transmission of a ring mode signal by supplying a coded pulsed signal to ring mode port 29. Signals as represented by pattern profiles 42 and 44 of FIG. 3A are thus radiated by the array of dipoles 10–13 in sequence. In order to accomplish this, ports 27 and 29 are coupled to duplexer devices within unit 30 to permit isolated receiver and transmitter operations in known manner. An aircraft equipped to receive the radiated signals recognizes the coded sum mode signal and then utilizes the difference mode signal to limit the antenna beam width to which the aircraft will respond in an IFF mode. Thus, the aircraft IFF transponder responds to the pencil beam antenna pattern 40, as shown in FIG. 3B, but does not respond when the aircraft IFF antenna is illuminated by portion 52 of sum mode beam profile 42 as represented in FIG. 3A. IFF signals radiated in response by the aircraft IFF transponder are received in the simultaneous sum and ring mode form of reception operation previously discussed and output information indicative of the presence of a properly responding friendly aircraft is provided at output port 31 of processor 30.

Each of the individual units included in the antenna system as shown in FIG. 2 can be implemented by workers skilled in the art using established technology. In particular, processor 30 may take the form of an existing type of IFF interrogator unit including input/output ports connected to internal receiver and transmitter modules via duplexer elements. Such an IFF unit includes capabilities for providing sequential coded signals suitable for coupling to intercoupling means 20 for formation of the sum mode and ring mode antenna patterns already described. Similarly, on reception, the IFF unit includes the capability of processing the simultaneous sum mode and ring mode signals to provide operation as described. In other arrangements, duplexer devices may be utilized at the radiating element ports (i.e., port 15 of dipole 12) with the antenna system arranged to operate with signals coupled through intercoupling means 20 only during reception or only during transmission. In such arrangements, the remaining function may be respectively provided via a transmitter or receiver connected to other ports of duplexers included at port 15 and the other dipole ports. Alternatively, two different forms of intercoupling means 20 may be utilized, one arranged to provide desired predetermined signal combining characteristics during transmission and the other arranged to provide differing predetermined signal combining characteristics during reception, with each coupled to the appropriate ports of duplexer devices connected to the radiating element ports, such as port 15. Dual mode (sum mode and ring mode) operation may thus be provided as desired during reception, transmission or both.

OPERATION

In operation, the FIG. 2 antenna system is effective to provide a linearly polarized antenna pattern directed primarily to the left in the direction of central axis 14. During reception, signals from radiating elements 10 and 12 are summed by hybrid coupler 22 and signals from radiating elements 11 and 13 are summed by hybrid coupler 24. The resulting first and second sum outputs appear at the upper, sum outputs of hybrids 22 and 24 and are then combined by divider/combiner 26 to provide the sum mode signal at port 27. At the lower, difference outputs of hybrids 22 and 24 there are respectively provided a first difference output representing a 180 degree out of phase combination of signals from elements 10 and 12 and a second difference output representing a similar 180 degree out of phase combination of signals from elements 11 and 13. The first and second difference outputs are then combined by quad-coupler 28 in a 90 degree quadrature relationship to provide the ring mode signal at port 29.

Figure 3C:
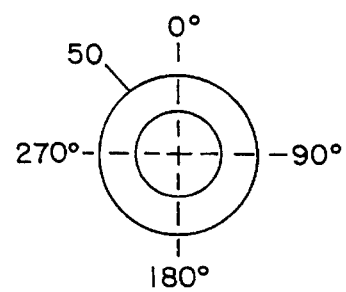

The sum and ring mode signals will be further described with reference to FIGS. 3A, 3B and 3C. FIG. 3A is a representation of a sectional side view of the composite antenna pattern viewed from a plane containing pattern axis 14a. Such cutting plane may be aligned at any angle relative to the crossed lines 16 and 18 in the FIG. 1 front view of the radiating element array, since the patterns are essentially circularly symmetrical. In FIG. 3A, sum mode pattern 42 is represented as a single peaked pattern surrounded by ring mode pattern 44 represented as a circular pattern having a central null or notch. Dotted line 48 represents a plane cutting through the composite antenna pattern. In FIG. 3B, circular beam profile 40 represents the intersection of plane 48 with the sum mode antenna pattern 42. In FIG. 3C, annular beam profile 50 represents the intersection of plane 48 with the ring mode antenna pattern 44 (shown in side view in FIG. 3A). As indicated in FIG. 3C, as a result of combining in an out of phase relationship signals from selected ones of said radiating elements positioned on opposite sides of pattern axis 14a (e.g., signals from elements 10 and 12 and from 11 and 13) to form first and second difference signals and combining the two difference signals in a quadrature phase relationship to form the ring signal, the ring signal has a zero to 360 degree progressive phase antenna pattern around pattern axis 14a. This is illustrated by the zero, 90, 180 and 270 degree signal phase markings included in FIG. 3C. The phasing of the ring mode signal 44 (represented by beam profile cross-section 50, in FIG. 3C) is thus consistent with the phasing of elements 10–13 resulting from the intercoupling of the radiating elements via units 22, 24 and 28 of intercoupling means 20.

In the FIG. 2 configuration, processor 30 is arranged to accomplish the desired beam sharpening by processing the sum and ring mode signals so as to provide at port 31 an antenna beam pattern representing portions of the sum mode pattern having an amplitude greater on a predetermined basis than the amplitudes of selected portions of the ring mode pattern. Thus, with reference to FIG. 3A, it will be seen that if patterns 42 and 44 are combined in a manner effective to delete from pattern 42 the portion 52, which represents the outer portion of the sum beam, pattern 42 is sharpened or narrowed so as to have a pencil beam characteristic as illustrated at 40 in FIG. 3B.

As noted above, during transmission the FIG. 2 antenna system may be arranged to radiate signals in the sum and ring mode antenna patterns in timed sequential fashion. This permits a properly equipped aircraft to receive pulsed signals representative of the sum mode pattern and then receive pulsed signals representative of the ring mode pattern. The ring mode signals can then be utilized by the aircraft IFF transponder to determine whether the aircraft was within the central, pencil beam portion of the sum mode antenna beam when the sum mode signal was received.

An IFF system operating with a pencil beam antenna pattern, as described, can be mechanically or manually aimed at a potential target aircraft. In such operation the system will be enabled to distinguish with improved accuracy between a selected target and other aircraft separated in elevation or azimuth from the selected target. In other applications of antenna systems in accordance with the invention, the sum and ring mode ports 27 and 29 may be coupled to other types of circuits in order to make use of the unique attributes of the forward-directed 360 degree progressive phase ring mode pattern alone or in combination with the sum mode pattern. As noted, while the antenna system has been primarily described in terms of signal reception, reciprocity applies so that the described antenna patterns are also provided during transmission (i.e., in a sequential relationship).

EMBODIMENTS OF FIGS. 4 AND 5

Figure 4:
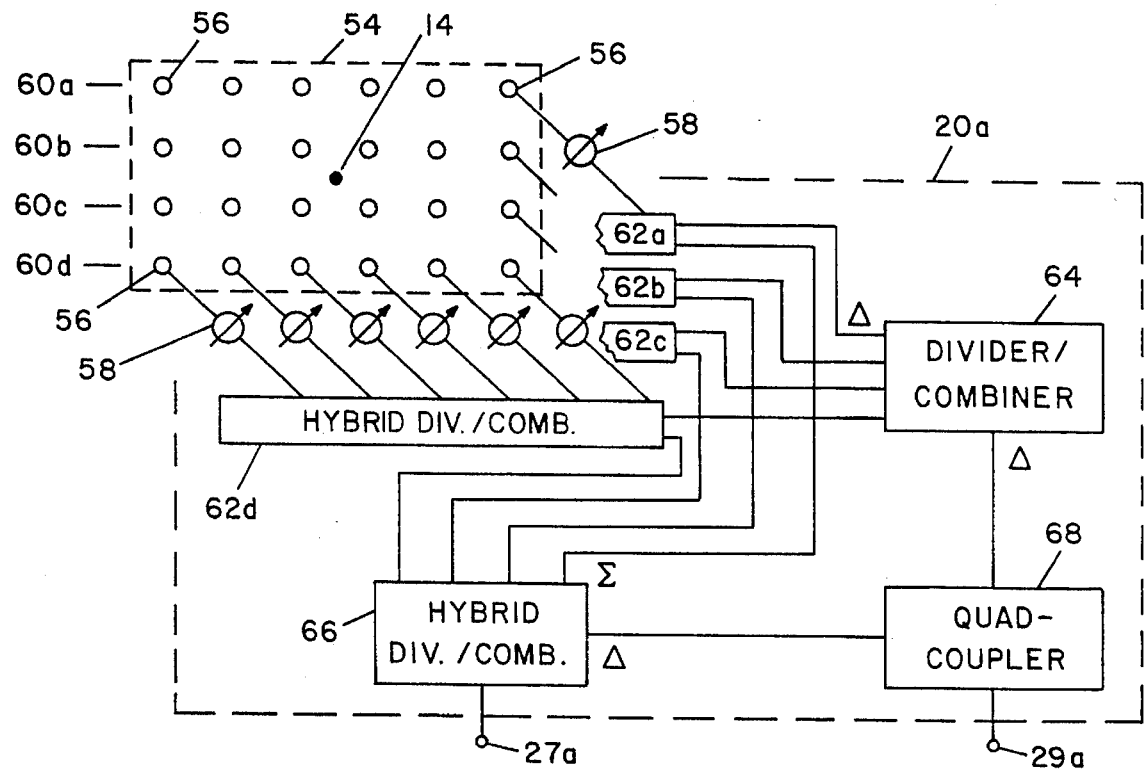
FIG. 4 is a block diagram of a second embodiment of antenna system in accordance with the invention, which includes a beam steerable phased array.

With reference now to FIG. 4, there is illustrated an embodiment of the invention which provides sum and ring mode operation with a larger array antenna which is arranged for two dimensional beam steering. As shown, array 54 includes a total of 24 radiating elements 56 arranged around central axis 14. A total of 24 phase shifters (not all of which are visible in the FIG. 4 representation) are arranged so that a variable phase shift device 58 is coupled to the feed line of each radiating element 56. Each radiating element 56 may be a similar dipole or other suitable radiating element and each phase shifter 58 may be an electronically controlled phase shift device or other suitable phase shifter applied in well known manner to enable operation of array 54 as a steerable-beam phased array. In FIG. 4, the plurality of radiating elements 56 are positioned around central axis 14 in rows and columns, including at least one row or column spaced from central axis at zero, 90, 180 and 270 degree positions around axis 14 (e.g., rows 60a and 60b are spaced at the zero degree position in the FIG. 4 orientation and rows 60c and 60d are spaced at the 180 degree position).

The FIG. 4 antenna system also includes intercoupling means 20a for intercoupling radiating elements 56 in the same basic manner as discussed with reference to the FIG. 2 antenna system. More specifically, intercoupling means 20a includes the following units. Means for combining signals from all of the radiating elements are illustrated as hybrid divider/combiner 62d, to which is coupled each radiating element 56 of row 60d, and similar units 62a, 62b and 62c, to which are respectively coupled the radiating elements of rows 60a, 60b and 60c. Hybrid divider/combiners 62a–d are effective to provide four intermediate sum signals (each representing a summing of signals from one row of radiating elements) and four intermediate difference signals (each representing a differential combining of signals from the radiating elements in one row which are at the 270 degree position relative to axis 14, with signals from the radiating elements at the 90 degree position). The four intermediate difference signals are coupled to means for summing those four signals, shown as divider/combiner 64, which provides a first difference output. The four intermediate sum signals are coupled to means for combining those four signals, shown as hybrid divider/combiner 66, which provides a second difference output and also provides the desired sum mode signal at sum mode port 27a. The first and second difference outputs from units 64 and 66, respectively, are coupled to means for combining those signals in a quadrature phase relationship, shown as quadcoupler 68, which is effective to provide the desired ring mode signal at ring mode port 29a, in the manner previously discussed. With an understanding of the invention, skilled individuals will be capable of providing units 62a–d, 64, 66 and 68 in forms suitable for providing the desired operation, which is reciprocal for reception and transmission. For example, hybrid divider/combiner 62d may include three hybrid junction devices, each coupling a radiating element on the left side of row 60d (270 degree position) to a correspondingly positioned radiating element on the right side of row 60d (90 degree position). The sum and difference ports of each of the three hybrid junction devices are then respectively summed to provide the intermediate sum and difference signals which are respectively coupled to units 66 and 64. Quad-coupler 68 may take the form of a well known 3 dB directional coupler arrangement or other suitable circuit. As shown, divider/combiner 64 merely sums the four intermediate difference signals in order to provide the first difference output, which is coupled to unit 68. The form and exemplary applications for the resulting sum and ring mode signals and related antenna patterns have been discussed with reference to FIG. 2. However, in contrast to the mechanically steered antenna of FIGS. 1 and 2, for which pattern axis 14a exists in superposition to central axis 14, in the case of a steerable-beam phased array antenna (as in FIG. 4) pattern axis 14a of FIG. 3A will change direction as the beam is steered.

Figure 5:
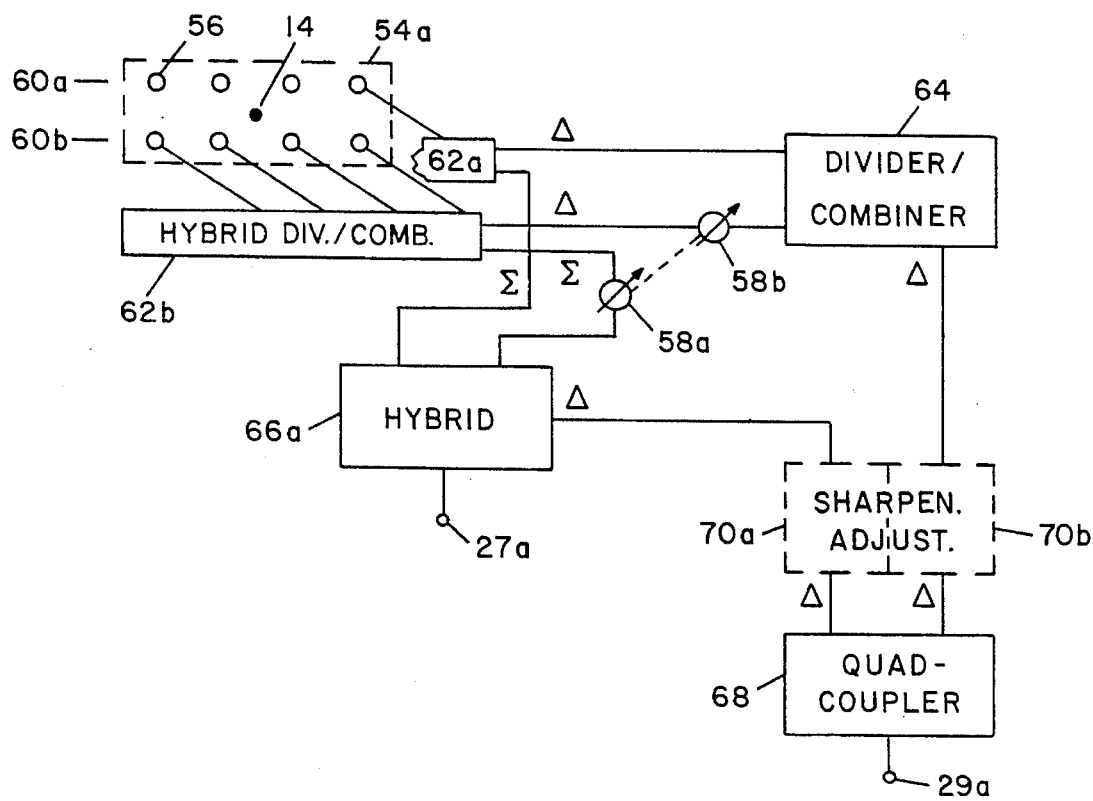
FIG. 5 is a block diagram of a third embodiment of an antenna system in accordance with the invention.

FIG. 5 shows an embodiment illustrating both a simplified beam steering arrangement and an arrangement permitting adjustment of beam sharpening to introduce an elliptical character to a circular beam sharpened antenna pattern, for example. The latter arrangement has optional application to each of the described embodiments of the invention. As illustrated in FIG. 5, array 54a includes radiating elements 56 arranged in only two rows 60a and 60b and a plurality of columns. With this arrangement, row 60a is spaced from central axis 14 at the zero degree position and row 60b is spaced at the 180 degree position. Hybrid divider/combiners 62a and 62b are arranged as described with reference to FIG. 4. In this embodiment, hybrid divider/combiner 62b provides a second intermediate sum signal which is coupled to hybrid coupler 66a, via variable phase shifter 58a. Similarly, a second intermediate difference signal provided by unit 62b is coupled to divider/combiner 64, via variable phase shifter 58b. As shown, phase shifters 58a and 58b are intercoupled to permit common adjustment. Whereas in FIG. 4 a phase shifter 58 is included for each of the 24 radiating elements, the FIG. 5 arrangement enables elevational beam steering while requiring inclusion of only two variable phase shifters 58a and 58b. With this arrangement, beam steering in elevation results from relative phase changes between signals coupled to the elements in row 60b, as compared to row 60a which receives fixed phase signals. This electronic beam steering in elevation can be combined with mechanical rotation of the antenna in applications of the FIG. 5 type antenna system.

The FIG. 5 embodiment also illustrates an arrangement enabling the beam sharpened antenna pattern as represented in FIG. 3B (representing the result of processing of the sum mode and ring mode signals which will be assumed to be of circular cross-section) to be changed so that the beam profile 40 has an elliptical characteristic. In FIG. 5, beam sharpening adjustment means is illustrated as comprising sharpening adjustment unit 70a/70b, which is shown dotted to indicate that its inclusion is optional to overall system operation. As shown, portion 70a is coupled to unit 68 in the transmission line shown as coupling the second difference output from hybrid 66a. Similarly, sharpening adjustment unit portion 70b is coupled in the first difference output line shown between units 64 and 68. As discussed with reference to FIGS. 3A–C, beam sharpening results from the effective deletion of portion 52 from pattern 42, utilizing the ring pattern 44, shown in crosssection at 50 in FIG. 3C. If both sum pattern 42 and ring pattern 44 have circular symmetry, the resulting sharpened beam pattern will have a circular beam cross-section characteristic resembling 40 in FIG. 3B. However, if ring mode pattern 44 includes portions of reduced amplitude (i.e., the amplitude of the ring signal at zero and 180 degrees in FIG. 3C is decreased relative to the amplitude at the 90 and 270 degree positions) portion 52 in FIG. 3A will not be of uniform amplitude at all angles relative to axis 14. As a result, there will be different levels of beam sharpening at different angular positions around axis 14, resulting in a non-circular (i.e., elliptical) sharpened antenna beam pattern which, as a result, is narrower in one beam cross-section dimension than in a quadrature dimension.

The above discussion assumes that the original antenna patterns are essentially circularly symmetrical, as would be expected from an antenna having equal vertical and horizontal aperture dimensions such as the FIG. 1 antenna. If the antenna has unequal aperture dimensions then its original patterns would typically be non-circular or elliptical. In this case the beam sharpening adjustment means 70a/70b allows the aspect ratio of the sharpened elliptical beam to be modified. For example, the array antennas of FIGS. 4 and 5 may have a vertical dimension smaller than the horizontal dimension. This would typically yield an elevation beamwidth wider than the azimuth beamwidth. The beam sharpening adjustment means 70a/70b allows the sharpened beam to have a different ratio of elevation to azimuth beamwidth, including a unity ratio, i.e., a circularly symmetric beam.

In FIG. 5, box 70a represents means, such as an attenuator, for reducing the amplitude of the second difference output coupled from unit 66a, so as to thereby make the beam sharpened antenna pattern, represented at 40, wider along the horizontal line 18 in FIG. 3B. Similarly, box 70b represents means for reducing the amplitude of the first difference output signal in order to make the beam cross-section wider along the quadrature axis 16 in FIG. 3B. While both portions of unit 70a/70b may be employed to reduce beam sharpening overall, an antenna system may include only one portion (70a or 70b) in order to provide a desired elliptical beam sharpening adjustment, which may be fixed or variable. While portion 70a or 70b may comprise a simple signal attenuator, any appropriate amplitude adjustment arrangement may be used in order to achieve the desired difference in values between the first and second difference outputs as supplied to unit 68. Alternatively, unit 70a/70b may comprise signal amplification means so that, in a manner parallel to that just described, a noncircular antenna pattern with enhanced sharpening can be obtained from a circular pattern by increasing the amplitude of one of the first and second difference outputs or, conversely, a circular antenna pattern can be obtained from an elliptical pattern. Also, in the case of uniform attenuation or amplification of both difference outputs, the same result can be obtained by placement of a single attenuator or amplification unit (e.g., 70a) in the line between unit 68 and ring mode port 29a. As noted, while unit 70a/70b is described in application to the FIG. 5 antenna system, beam sharpening adjustment means can similarly also be included in other embodiments of the invention.

While there have been described the currently preferred embodiments of the invention, those skilled in the art will recognize that other and further modifications and variations may be made without departing from the invention and it is intended to claim all such modifications as fall within the scope of the invention.

What is claimed is:

1. A dual mode antenna system, having a sum mode and a ring mode and providing 360 degree beam sharpening, comprising:

an array of radiating elements positioned at zero, 90, 180 and 270 degree relative positions around a central axis, each said radiating element arranged to provide an antenna pattern nominally in the directions of said central axis;

intercoupling means, intercoupling said radiating elements, including:

(a) means for combining signals from said radiating elements at said zero and 180 degree positions to provide a first sum output and a first difference output;

(b) means for combining signals from said radiating elements at said 90 and 270 degree positions to provide a second sum output and a second difference output;

(c) means for combining said first and second sum outputs to provide a sum mode signal; and (d) means for combining said first and second difference outputs in a quadrature phase relationship to provide a linearly polarized ring mode signal representing an antenna pattern having a zero to 360 degree progressive phase characteristic around said central axis;

sharpening adjustment means, coupled to said means for combining said first and second difference outputs, for adjusting the amplitude of one of said first and second difference outputs prior to said combining of said outputs in said quadrature phase relationship, to cause said ring mode signal to have portions of different amplitude;

a sum mode port and a ring mode port, coupled to said intercoupling means, for respectively enabling said sum mode signal and said ring mode signal to be coupled from said intercoupling means; and processing means, coupled to said sum and ring mode ports, for processing said sum mode and ring mode signals to provide a beam sharpened antenna pattern representing portions of said sum mode signal of amplitude greater on a predetermined basis than the amplitudes of selected portions of said ring mode signal.

2. A dual mode antenna system as in claim 1, wherein each of said radiating elements is a dipole with its arms aligned in a common plane perpendicular to said central axis, with all of said arms of said dipoles extending in a common direction.

3. A dual mode antenna system as in claim 1, wherein said processing means is arranged to provide said beam sharpened antenna pattern during signal reception and is further arranged for coupling the following signals to said intercoupling means during signal transmission:

a first pulsed signal, coupled to said sum mode port, for causing a sum mode signal to be radiated by said array of radiating elements; and a second pulsed signal, coupled to said ring mode port in a predetermined time sequence relative to said first pulsed signal, for causing a ring mode signal to be radiated by said array of radiating elements.

4. A dual mode antenna system as in claim 3, wherein each of said radiating elements comprises a dipole aligned to provide a vertically polarized radiation pattern.

5. A dual mode antenna system, having a sum mode and a ring mode, comprising:

an array of radiating elements positioned around a central axis in rows and columns, including at least one column or a plurality of rows of said radiating elements spaced from said central axis at each of zero, 90, 180 and 270 degree positions around said central axis, each said radiating element arranged to provide an antenna pattern nominally in the direction of said central axis;

intercoupling means, intercoupling said radiating elements, for providing a sum mode signal by combining signals from a plurality of said radiating elements and for providing a ring mode signal, representing an antenna pattern having a zero to 360 degree progressive phase characteristic around said central axis, by combining in an out of phase relationship signals from selected ones of said radiating elements positioned on opposite sides of said central axis to form two difference signals and combining said two difference signals in a quadrature phase relationship to form said ring mode signal;

phase shift means, coupled to the feed paths of a plurality of said radiating elements, for adjusting the relative phase of signals coupled to said radiating elements; and processing means, coupled to said intercoupling means, for processing said sum mode and ring mode signals in a predetermined manner.

6. A dual mode antenna system as in claim 5, wherein each of said radiating elements comprises a dipole aligned to provide a vertically polarized antenna pattern.

7. A dual mode antenna system as in claim 5, wherein said processing means is additionally configured for coupling the following signals to said intercoupling means during signal transmission:

a first pulsed signal for causing a sum mode signal to be radiated by said array of radiating elements; and a second pulsed signal, coupled in a predetermined time sequence relative to said first pulsed signal, for causing a ring mode signal to be radiated by said array of radiating elements.

8. A dual mode antenna system, having a sum mode and a ring mode comprising:

an array of radiating elements positioned around a central axis, each said radiating element arranged to provide an antenna pattern nominally in the direction of said central axis;

intercoupling means, intercoupling said radiating elements, for providing a sum mode signal by combining signals from a plurality of said radiating elements and for providing a ring mode signal representing an antenna pattern having a zero to 360 degree progressive phase characteristic around said central axis, by combining in a predetermined differential-phase relationship signals from selected ones of said radiating elements positioned around said central axis;

a sum mode port and a ring mode port, coupled to said intercoupling means, for respectively enabling coupling of said sum mode signal and said ring mode signal; and means, coupled to said sum and ring mode ports, for coupling to said ports during signal transmission:

a first pulsed signal, coupled to said sum mode port, for causing a sum mode signal to be radiated by said array of radiating elements; and a second pulsed signal, coupled to said ring mode port in a predetermined time sequence relative to said first pulsed signal, for causing a ring mode signal to be radiated by said array of radiating elements.

9. An antenna system as in claim 8, wherein each of said radiating elements is a dipole with its arms aligned in a common plane perpendicular to said central axis, with all of said arms of said dipoles extending in a common direction.

10. A dual mode antenna system as in claim 8, wherein said array comprises a plurality of radiating elements positioned around said central axis in rows and columns, including at least one column or a plurality of rows of said radiating elements spaced from said central axis at each of zero, 90, 180 and 270 degree positions around said central axis.

11. A dual mode antenna system as in claim 10, wherein said intercoupling means comprises:

means for combining signals from all of said radiating elements to provide intermediate sum signals and intermediate difference signals;

means for combining said intermediate difference signals to provide a first difference output;

means for combining said intermediate sum signals to provide a second difference output and said sum mode signal; and means for combining said first and second difference outputs in a quadrature phase relationship to provide said ring mode signal.

12. A dual mode antenna system as in claim 11, additionally comprising beam sharpening adjustment means, coupled to said means for combining said first and second difference outputs, for adjusting the amplitude of one of said first and second difference outputs prior to said combining of said outputs in said quadrature phase relationship, whereby said ring mode signal is caused to have portions of different amplitude.

13. A dual mode antenna system as in claim 11, additionally comprising phase shift means, coupled to said means for combining signals from all of said radiating elements, for adjusting the relative phase of selected ones of said intermediate sum and difference signals.

14. A dual mode antenna system as in claim 8, additionally comprising phase shift means, coupled to the feed paths of a plurality of said radiating elements, for adjusting the relative phase of signals coupled to said radiating elements to adjust the direction of the sum mode and ring mode antenna patterns relative to the direction of said central axis.

15. A dual mode antenna system as in claim 14, wherein said array comprises a plurality of radiating elements positioned around said central axis in rows and columns, including at least one column or a plurality of rows of said radiating elements spaced from said central axis at each of zero, 90, 180 and 270 degree positions around said central axis.

16. A dual mode antenna system as in claim 8, wherein said array consists of only two rows of radiating elements arranged in a plurality of columns, including at least one column or a plurality of rows of said radiating elements spaced from said central axis at each of zero, 90, 180 and 270 degree positions around said central axis.

17. A dual mode antenna system as in claim 16, wherein said intercoupling means comprises:

means for combining signals from all of said radiating elements to provide first and second intermediate sum signals and first and second intermediate difference signals;

means for combining said first and second intermediate sum signals to provide a second difference output and said sum mode signal; and means for combining said first and second difference outputs in a quadrature phase relationship to provide said ring mode signal.

18. A dual mode antenna system as in claim 17, additionally comprising phase shift means consisting of only two variable phase shifters, a first variable phase shifter arranged for adjusting the phase of said second intermediate sum signal and a second variable phase shifter intercoupled for common adjustment with said first variable phase shifter, and arranged for adjusting the phase of said second intermediate difference signal, whereby said second intermediate sum and difference signals are subjected to substantially equal phase adjustments.

19. A dual mode antenna system as in claim 17, additionally comprising beam sharpening adjustment means, coupled to said means for combining said first and second difference outputs, for adjusting the amplitude of one of said first and second difference outputs prior to said combining of said outputs in said quadrature phase relationship, whereby said ring mode signal is caused to have portions of different amplitude.

* * * * *